No. 655,871.   Patented Aug. 14, 1900.
A. B. JOHNSON.
CHURN.
(Application filed June 4, 1900.)
(No Model.)
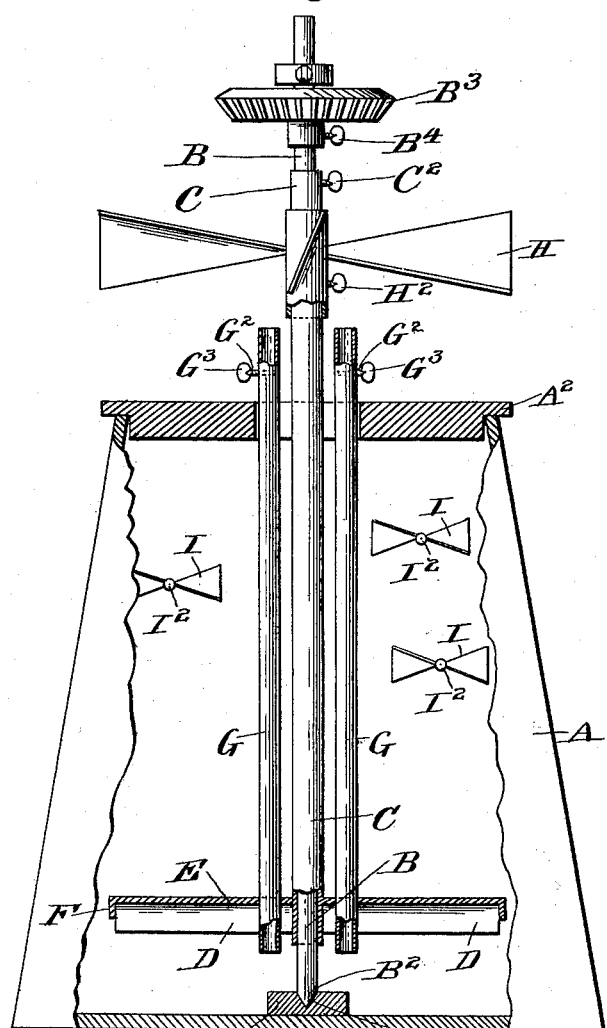
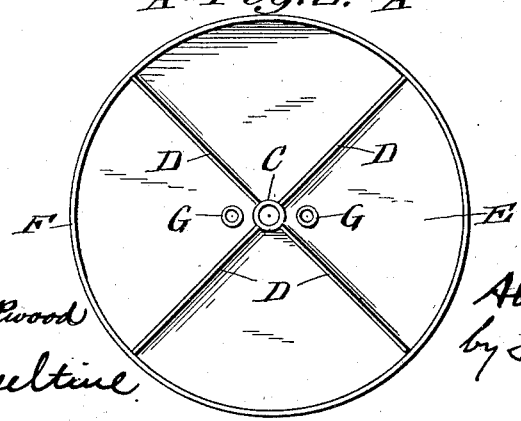
Witnesses
Jas N Blackwood
M. L. Haseltine
Inventor
Abner B. Johnson
by S. A. Haseltine
Attorney
THE NORRIS PETERS CO., PHOTO-LITHO., WASHINGTON, D. C.

UNITED STATES PATENT OFFICE.

ABNER B. JOHNSON, OF SPRINGFIELD, MISSOURI.

CHURN.

SPECIFICATION forming part of Letters Patent No. 655,871, dated August 14, 1900.

Application filed June 4, 1900. Serial No. 19,088. (No model.)

*To all whom it may concern:*

Be it known that I, ABNER B. JOHNSON, a citizen of the United States, residing at Springfield, in the county of Greene and State of Missouri, have invented certain new and useful Improvements in Churns; and I do hereby declare the following to be a full, clear, and exact description of the invention, such as will enable others skilled in the art to which it appertains to make and use the same.

My invention relates to improvements in churns, the object of which is to provide a churn that will quickly produce butter from milk or cream.

This invention consists in a mechanism for forcing air through the cream while it is kept constantly agitated and a device for preventing the cream from rising and overflowing the churn, all fully described, combined, and specified in the claim, the same being illustrated in the accompanying drawings, forming a part of this specification, in which—

Figure 1 is a view giving an elevation of the entire device, a part of the churn being removed to show the interior. Fig. 2 is a detail showing the under side of the dasher.

Similar letters of reference indicate corresponding parts.

A is an ordinary churn of any desired size and shape, having a cover $A^2$, with an opening in the center of any desired size for receiving the dasher and air-pipes, said churn also having a cup $A^3$ in the bottom for receiving the lower end of the revolving dasher to form a bearing for the same. In glass and earthen churns a cross-piece $A^4$, having a cup-bearing $A^3$, may be used in the bottom of the churn.

B is a dasher-rod provided with a pointed end bearing $B^2$ at the bottom of a churn and having a pinion $B^3$ for operating the said dasher by means of any ordinary power. Said pinion is provided with a sleeve having a thumb-screw $B^4$ for adjusting the same at any desired height. The upper end of said dasher-shaft B may be provided with any suitable bearing in the framework which supports the upper or drive wheels. C is a sleeve on the said dasher-shaft B, secured in position by means of a thumb-screw $C^2$, so that the same may be raised or lowered, as desired, according to the depth of cream or milk to be churned. On the lower end of said sleeve are secured the cross-dashers D, to the top of which is secured a solid disk E, having a rim F projecting downward around its periphery. Said rim F is preferably made to extend downward so as to cover about half of the width of the cross-dashers D, the dashers D being made of any desired size and length, according to the size of the churn in which they are to be used.

At opposite sides of sleeve C air-tubes G, which are secured to disk E, extend from a desired point above the covers $A^2$ and through the disk E to a point preferably below the lower edge of the dashers D for conducting air down into the cream as the dashers revolve. Said air pipes or tubes G are provided with suitable dampers or stop-cocks $G^2$, which may be operated, by means of thumb-pieces $G^3$, for regulating the quantity of air to enter the cream.

H is a fan for driving or forcing air downward to enter the air-tubes G. Said fan is provided with a sleeve having a set or thumb screw $H^2$ for adjusting the height of the fan or its distance from the air-tubes to regulate the force of the air to be driven into the milk through the air-tubes G.

This process of churning fills the cream or milk with air to such an extent that it would flow over the top of the churn without something to keep it down. This I provide against by using three or more fan-shaped wheels I. These break the foam-bubbles and prevent the cream from running over the top of the churn. These fans I are secured to the inner surface of the churn A at different heights, so that one or more will be above the surface of the milk or cream to be churned. They are provided with an axis $I^2$ for permitting the said wheels I to revolve for the purpose of breaking the air-bubbles, as specified.

Having thus described my invention, what I claim as new, and desire to secure by Letters Patent, is—

The combination of a churn, A, having a bearing, $A^3$, and a revolving dasher-rod, B, with a sleeve C, having dashers D, a disk E, with a rim, F, air-tubes G, having dampers $G^2$, a fan-wheel H, and fans, I, all substantially as and for the purpose specified.

In testimony whereof I affix my signature in presence of two witnesses.

ABNER B. JOHNSON.

Witnesses:
S. A. HASELTINE,
M. L. HASELTINE.